United States Patent
Zhao

(10) Patent No.: US 10,222,640 B2
(45) Date of Patent: Mar. 5, 2019

(54) CURVED DISPLAY PANEL AND DISPLAY DEVICE CONTAINING THE SAME

(71) Applicant: BOE TECHNOLOGY GROUP CO., LTD, Beijing (CN)

(72) Inventor: Weili Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 34 days.

(21) Appl. No.: 15/509,880

(22) PCT Filed: Aug. 12, 2016

(86) PCT No.: PCT/CN2016/094870
§ 371 (c)(1),
(2) Date: Mar. 9, 2017

(87) PCT Pub. No.: WO2017/118024
PCT Pub. Date: Jul. 13, 2017

(65) Prior Publication Data
US 2018/0231822 A1 Aug. 16, 2018

(30) Foreign Application Priority Data
Jan. 5, 2016 (CN) .......................... 2016 1 0006704

(51) Int. Cl.
*G02F 1/1335* (2006.01)
*G02F 1/1333* (2006.01)
*G02F 1/1339* (2006.01)

(52) U.S. Cl.
CPC ...... *G02F 1/133305* (2013.01); *G02F 1/1339* (2013.01); *G02F 1/133512* (2013.01); *G02F 1/133514* (2013.01)

(58) Field of Classification Search
None
See application file for complete search history.

(56) References Cited

U.S. PATENT DOCUMENTS 4,946,259 A * 8/1990 Matino ............. G02F 1/133514
349/106
2005/0007527 A1 1/2005 Maeda
(Continued)

FOREIGN PATENT DOCUMENTS

CN 1573428 A 2/2005
CN 101191938 A 6/2008
(Continued)

OTHER PUBLICATIONS

The World Intellectual Property Organization (WIPO) International Search Report and Written Opinion for PCT/CN2016/094870 dated Oct. 27, 2016 15 Pages.
(Continued)

*Primary Examiner* — James A Dudek
(74) *Attorney, Agent, or Firm* — Westerman, Hattori, Daniels & Adrian, LLP

(57) ABSTRACT

The present disclosure provides a curved display panel, including a first substrate and an opposing second substrate, the first substrate including a light-filtering layer. The light-filtering layer includes a first light-filtering unit, a second light-filtering unit, and a third light-filtering unit in a pixel unit; and at least one of an effective light-filtering area of the second light-filtering unit and an effective light-filtering area of the third light-filtering unit is larger than or smaller than an effective light-filtering area of the first light-filtering unit. A ratio of the effective light-filtering area of the second light-filtering unit to the effective light-filtering area of the first light-filtering unit is greater than or equal to about 0.9 and less than about 1, or is greater than about 1 and less than or equal to about 1.1.

13 Claims, 6 Drawing Sheets

(56) References Cited

U.S. PATENT DOCUMENTS

| | | | |
|---|---|---|---|
| 2007/0008463 A1* | 1/2007 | Tanaka | G02F 1/133514 349/107 |
| 2008/0129937 A1 | 6/2008 | Lin et al. | |
| 2015/0205160 A1 | 7/2015 | Kim et al. | |
| 2017/0213850 A1 | 7/2017 | Dong et al. | |

FOREIGN PATENT DOCUMENTS

| | | |
|---|---|---|
| CN | 103310746 A | 9/2013 |
| CN | 104076552 A | 10/2014 |
| CN | 104391410 A | 3/2015 |
| CN | 104423079 A | 3/2015 |
| CN | 104932137 A | 9/2015 |
| CN | 105093653 A | 11/2015 |
| CN | 105404052 A | 3/2016 |
| JP | 2003215560 A | 7/2003 |
| JP | 2009210935 A | 9/2009 |

OTHER PUBLICATIONS

State Intellectual Property Office of the P.R.C (SIPO) Office Action 1 for 201610006704.9 dated Jan. 3, 2018 19 Pages.

\* cited by examiner

CURVED DISPLAY PANEL AND DISPLAY DEVICE CONTAINING THE SAME

CROSS-REFERENCES TO RELATED APPLICATIONS

This PCT patent application is a national phase entry under 35 U.S.C. § 371 of International Application No. PCT/CN2016/094870, filed on Aug. 12, 2016, which claims priority of Chinese Patent Application No. 201610006704.9, filed on Jan. 5, 2016. The above enumerated patent applications are incorporated by reference herein their entirety.

TECHNICAL FIELD

The present invention generally relates to the display technologies and, more particularly, relates to a curved display panel and a display device containing the display panel.

BACKGROUND

As the display technology advances, curved display panels have been used in various applications. The curvature of a curved display panel is often comparable to the curvature of viewer's retina, so that curved display panels can provide better display effect. Curved display panels have drawn widespread attention in the market and industry.

However, conventional curved display panel is susceptible to issues including yellowing and appearing dark at bending locations, which can cause impaired display of the curved display panel. Thus, the display effect of the conventional curved display panels needs to be improved.

BRIEF SUMMARY

The present disclosure provides a curved display panel. By using the disclosed curved display panel, display difference between the subpixels, located at the bending or curving locations and disposed with spacers, and other subpixels may be reduced.

One aspect of the present disclosure includes a curved display panel, including: a first substrate and an opposing second substrate, the first substrate comprising a light-filtering layer. The light-filtering layer includes a first light-filtering unit, a second light-filtering unit, and a third light-filtering unit in a pixel unit; and at least one of an effective light-filtering area of the second light-filtering unit and an effective light-filtering area of the third light-filtering unit is larger than or smaller than an effective light-filtering area of the first light-filtering unit. A ratio of the effective light-filtering area of the second light-filtering unit to the effective light-filtering area of the first light-filtering unit is greater than or equal to about 0.9 and less than about 1, or is greater than about 1 and less than or equal to about 1.1; and a ratio of the effective light-filtering area of the third light-filtering unit to the effective light-filtering area of the first light-filtering unit is greater than or equal to about 0.9 and less than about 1, or is greater than about 1 and less than or equal to about 1.1.

Optionally, at least one light-transmitting hole is formed in at least one of the second light-filtering unit and the third light-filtering unit, the light-transmitting hole allowing white light emitted by a backlight source to pass through.

Optionally, a diameter of a light-transmitting hole is greater than or equal to 3 μm.

Optionally, at least one white light-filtering subunit is formed on at least one of the second light-filtering unit and the third light-filtering unit, the white light-filtering subunit converting light pass there-through to white light.

Optionally, an area of the white light-filtering subunit is greater than or equal to 9 μm$^2$.

Another aspect of the present disclosure provides a curved display panel, including: a first substrate and an opposing second substrate, the first substrate comprising a light-filtering layer. The light-filtering layer includes a first light-filtering unit, a second light-filtering unit, and a third light-filtering unit in a pixel unit; and a light transmission rate of the first light-filtering unit is higher than or lower than a light transmission rate of at least one of the second light-filtering unit and the third light-filtering unit. A ratio of the light transmission rate of the first light-filtering unit to the light transmission rate of the second light-filtering unit is greater than or equal to about 0.8 and less than about 1, or is greater than about 1 and less than or equal to about 1.2; and a ratio of the light transmission rate of the first light-filtering unit to the light transmission rate of the third light-filtering unit is greater than or equal to about 0.8 and less than about 1, or is greater than about 1 and less than or equal to about 1.2.

Optionally, a thickness of the first light-filtering unit is smaller than a thickness of the second light-filtering unit.

Optionally, a thickness of the first light-filtering unit is smaller than a thickness of the third light-filtering unit.

Optionally, the curved display panel further includes a protective layer covering the first light-filtering unit, the second light-filtering unit, and the third light-filtering unit.

Optionally, a thickness of a portion of the protective layer covering the first light-filtering unit is smaller than a thickness of a portion of the protective layer covering the second light-filtering unit.

Optionally, a thickness of a portion of the protective layer covering the first light-filtering unit is smaller than a thickness of a portion of the protective layer covering the third light-filtering unit.

Optionally, light passing through the first light-filtering unit, the second light-filtering unit, and the third light-filtering unit form light of three primary colors.

Optionally, the light passing through the first light-filtering unit is blue light; the light passing through the second light-filtering unit is green light; and the light pasting through the third light-filtering unit is red light.

Another aspect of the present disclosure provides a display device. The display device includes one or more of the disclosed curved display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1b illustrates effective display areas of different subpixels illustrated in FIG. 1a;

FIG. 1c illustrates misalignment between an array substrate and a color filter substrate when bending the curved display panel illustrated in FIG. 1a;

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

Figure 1A:
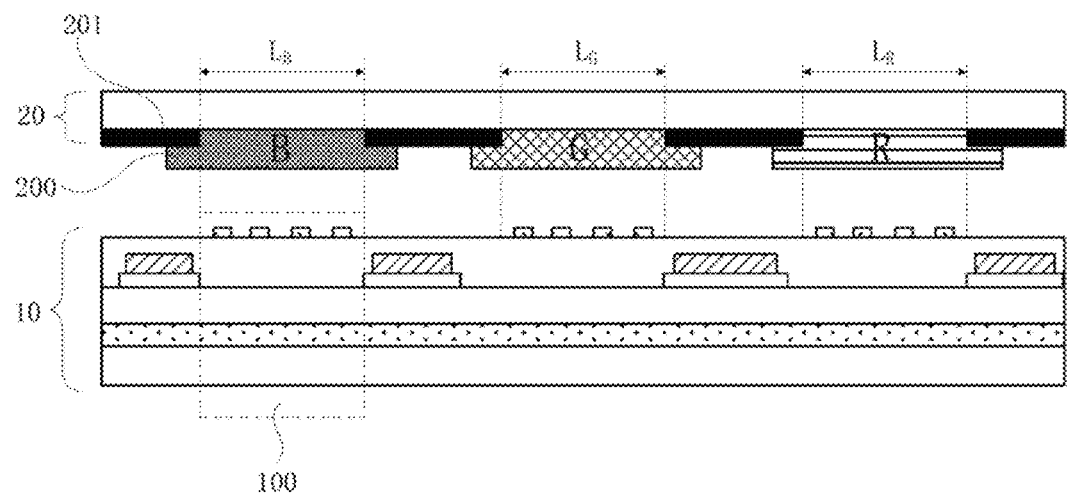
FIG. 1a illustrates a conventional curved display panel.

A curved display panel may include a liquid crystal display (LCD) panel. As shown in FIG. 1a, the LCD panel includes an array substrate 10 and a color filter substrate 20 aligned and bonded together. The array substrate 10 includes a plurality of subpixels 100. Each subpixel 100 corresponds to a light-filtering unit 200 (red/R, green/G, or blue/B) on the color filter substrate 20.

Figure 1B:
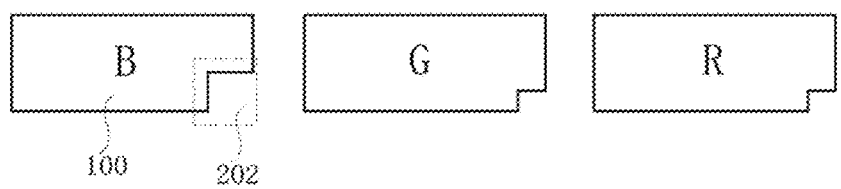

Conventionally, a spacer between the array substrate 10 and the color filter substrate 20 is often disposed at the location of a subpixel 100. e.g., the location where the blue subpixel B is formed. To effectively support the spacer, a larger area 202 is often used for forming the thin-film transistor (TFTs) in the blue subpixel B. As a result, as shown in FIG. 1b, the effective display area of the blue subpixel B is smaller than the effective display areas of the green subpixel G and the red subpixel R.

Figure 1C:
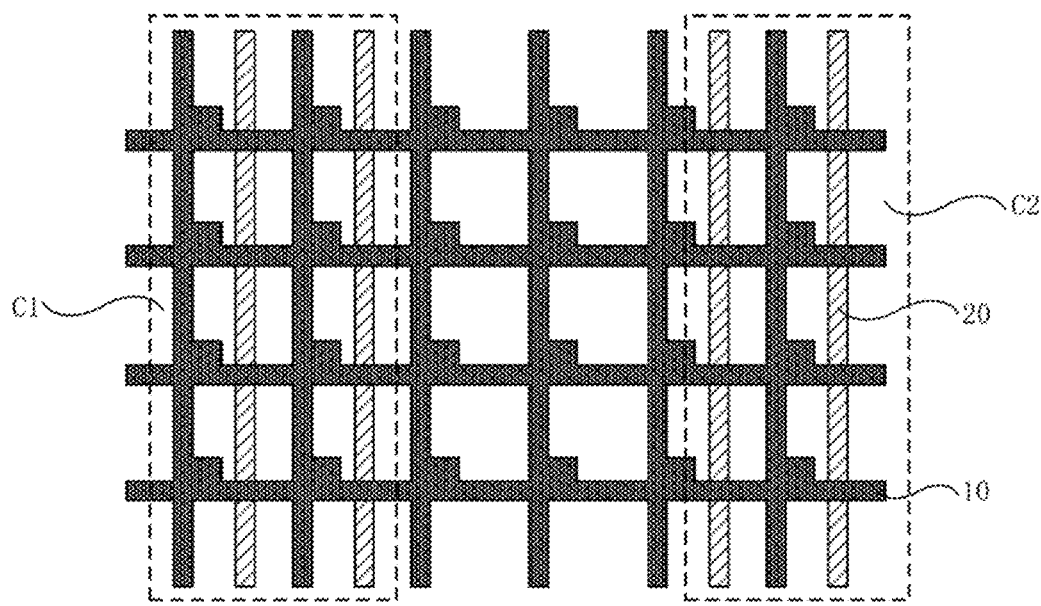

Further, to form a curved display panel, the display panel needs to be bent or curved. Because the array substrate 10 and the color filter substrate 20 are subjected to different bending forces, the array substrate 10 and the color filter substrate 20 may undergo different amounts of deformation. Accordingly, the array substrate 10 and the color filter substrate 20 may be misaligned. For example, as shown in FIG. 1c, region C1 and region C2, each on a different side of a curved display panel, may undergo substantial deformation. As a result, the misalignment between the array substrate 10 and the color filter substrate 20 are substantial. The misalignment in region C1 and the misalignment in region C2 have opposite directions.

Figure 1D:
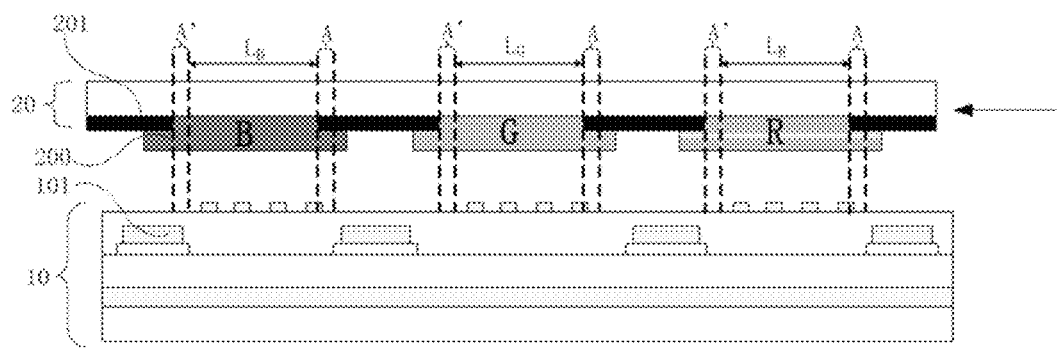
FIG. 1d illustrates a cross-sectional view of region C2 illustrated in FIG. 1c.

For example, in region C2, as shown in FIG. 1d, the color filter substrate 20 undergoes misalignment to the left with respect to the array substrate 10. Accordingly, a subpixel 100) and the corresponding light-filtering unit 200 can be misaligned. Portion A, as shown in FIG. 1d, of the subpixel 100 can be blocked or covered by the light shielding material/matrix 201. Also, a portion A', as shown in FIG. 1d, of the light-filtering unit 200 can be blocked or covered by a data line 101. As a result, the width, e.g., $L_B$, $L_G$, or $L_R$, of the effective display area of a subpixel 100 is reduced. Light transmission rate of the subpixel 100 is reduced accordingly. Because a spacer is placed where the blue subpixel B is located and the blue subpixel B already has a smaller effective display area, the light-filtering unit 200 being blocked by the light shielding material 201 and/or the data line 101 may further have reduced effective display area of the blue subpixel 100. For the curved display panel, the display difference between the blue subpixels B and the red subpixels R, or between the blue subpixels B and the green subpixels G may be substantial. Display effect of the curved display panel can be impaired.

Figure 1E:
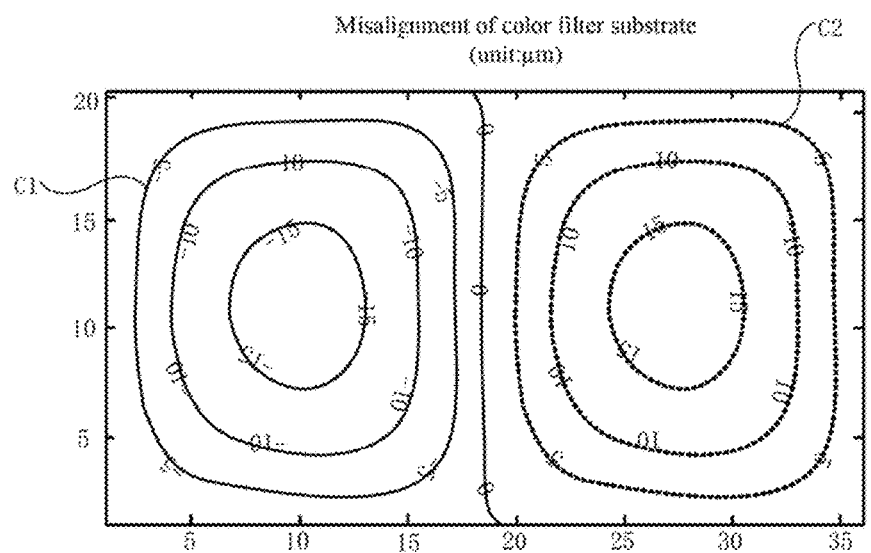
FIG. 1e illustrates the misalignment of the color filter substrate in regions C1 and C2 illustrated in FIG. 1c.

In FIG. 1e, the amount of misalignment of the color filter substrate 20 in region C1 is indicated by the pattern in solid circles, and the amount of misalignment of the color filter substrate 20 in region C2 is indicated by the pattern in dashed circles. The amount of misalignment reaches the maximum at the center of each pattern, with an absolute value of about 15 μm. That is, maximum misalignment occurs at the center of region C1/C2. In other words, display difference is the most prominent at the centers of regions C1 and C2.

The present disclosure provides a curved display panel. The curved display panel includes a first substrate, and an opposing a second substrate, the first substrate comprising a light-filtering layer. The light-filtering layer comprises a first light-filtering unit, a second light-filtering unit, and a third light-filtering unit in a pixel unit; and at least one of a ratio of an effective light-filtering area of the second light-filtering unit to an effective light-filtering area of the first light-filtering unit and a ratio of an effective light-filtering area of the third light-filtering unit to an effective light-filtering area of the first light-filtering unit is in a first preset range, the first preset range being greater than or equal to about 0.9 and less than about 1, or greater than 1 and less than or equal to about 1.1.

Figure 2:
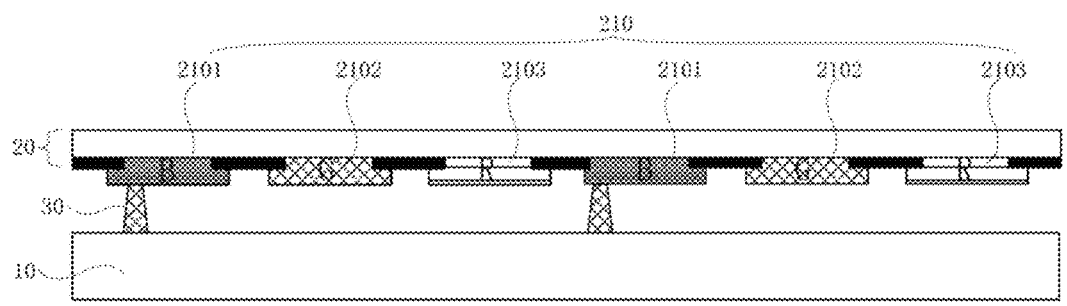
FIG. 2 illustrates an exemplary curved display panel according to various disclosed embodiments of the present disclosure.

FIG. 2 illustrates a cross-sectional view of an exemplary curved display panel. The curved display panel may include a first substrate and a second substrate aligned and bonded together, i.e., the first substrate and the second substrate may be opposing each other. The curved display panel may also include spacers 30 formed between the first substrate and the second substrate. In some embodiments, the first substrate may be a color filter substrate 20, and the second substrate may be an array substrate 10. In some embodiments, the spacers 30 may not be included. For illustrative purposes, the disclosure is illustrated with the first substrate being the color filter substrate 20 and the second substrate being the array substrate 10. In other various embodiments, the first substrate may be the array substrate 10 and the second substrate may be the color filter substrate 20.

The first substrate may include a light-filtering layer 210 for filtering the white light emitted by the backlight source of the curved display panel. The light-filtering layer 210 may include a plurality of light-filtering units. As shown in FIG. 2, a first light-filtering unit 2101 may correspond to a first subpixel in a pixel unit, a second light-filtering unit 2102 may correspond to a second subpixel in the pixel unit, and a third light-filtering unit 2103 may correspond to a third subpixel in the pixel unit. A spacer 30 may be formed at the location of a first light-filtering unit 2101.

The effective light-filtering area of a second light-filtering unit 2102 and/or the effective light-filtering area of a third light-filtering unit 2103 may be greater than or smaller than the effective light-filtering area of a first light-filtering unit 2101.

In some embodiments, the ratio of the effective light-filtering area of a second light-filtering unit 2102 to the effective light-filtering area of a first light-filtering unit 2101 may be in a first preset range.

In some embodiments, the ratio of the effective light-filtering area of a third light-filtering unit 2103 to the effective light-filtering area of a first light-filtering unit 2101 may be in the first preset range. The first preset range may be greater than or equal to about 0.9 and less than about 1, or greater than about 1 and less than or equal to about 1.1

Light passing through the first light-filtering unit 2101, the second light-filtering unit 2102, and the third light-filtering unit 2103 may form light of three primary colors, e.g., blue (B) light, green (G) light, and red (R) light. In a pixel unit, the first light-filtering unit 2101, the second light-filtering unit 2101, and the third light-filtering unit 2103 may each correspond to a subpixel 100 of a different color.

Further, the first light-filtering unit 2101, the second light-filtering unit 2102, and the third light-filtering unit 2103 corresponding to a pixel unit refers to the locations of the three light-filtering units corresponding to the location of the pixel unit. The first light-filtering unit 2101, the second light-filtering unit 2102, and the third light-filtering unit 2103 may each correspond to a subpixel 100 of a different color in the pixel unit. Thus, the three subpixels 100 corresponding to the three light-filtering units, i.e., the first light-filtering unit 2101, the second light-filtering unit 2102, and the third light-filtering unit 2103, may form the pixel unit. In other words, the pixel unit may include the three subpixels 100 of different colors.

It should be noted that, the specific colors of the three primary colors should not be limited by the embodiments of the present disclosure. For example, the three primary colors may be red, green, and blue. The three primary colors may also be cyan, magenta, and yellow. For illustrative purposes, in the present disclosure, the first light-filtering unit 2101 may be configured to emit blue (B) light, the second light-filtering unit 2102 may be configured to emit green (G) light, and the third light-filtering unit 2103 may be configured to emit red (R) light.

Further, in the present disclosure, the effective light-filtering area refers to the actual area, of a light-filtering unit, used for filtering the white light emitted by the backlight source and generating monochromatic light. The light-filtering unit may be a first light-filtering unit 2101, a second light-filtering unit 2102, or a third light-filtering unit 2103. The white light emitted by the backlight source may pass through the first light-filtering unit 2101, and the effective light-filtering area may convert the white light to blue light.

Further, by applying the first preset range, human eyes are not able to distinguish the intensity differences among monochromatic light emitted by different light-filtering units. Thus, even when the curved display panel is deformed, causing the effective display area of a first light-filtering unit 2101, located at a bending location and disposed with a spacer 30, to further decrease, the effective light-filtering areas of the first light-filtering unit 2101, the second light-filtering unit 2102, and the third light-filtering unit 2103 may be the same or comparable. It can be ensured that, the white light emitted by the backlight source, after passing through the first light-filtering units 2101, the second light-filtering units 2102, and the third light-filtering units 2103, may be converted to blue (B) light, green (G) light, and red (R) light of comparable or same intensities. Human eyes are not able to distinguish the intensity differences among the monochromatic light emitted by each light-filtering unit. Accordingly, yellowing of the curved display panel at a bending location, caused by reduced effective display area of a first light-filtering unit 2101 and a reduced amount of blue (B) light, may be less likely to occur. In other words, after forming yellow light by mixing the green (G) light and the red (R) light, which are of greater intensities compared to the reduced amount of blue (B) light, failure of proper mixing between the blue (B) light and the yellow light may be less likely to occur.

Further, by setting the first preset range to be greater than or equal to about 0.9 and less than about 1, or greater than about 1 and less than or equal to about 1.1, the difference between effective light-filtering areas of the first light-filtering unit 2101 and the second light-filtering unit 2102 may be controlled to be less than about 10%, and/or the difference between effective light-filtering areas of the first light-filtering unit 2101 and the third light-filtering unit 2103 may be controlled to be less than about 10%. Similarity level between the effective light-filtering areas of the first light-filtering unit 2101 and of the second light-filtering unit 2102/the third light-filtering unit 2103 may be improved. Human eyes may recognize the amount of blue (B) light being the same as the amount of green (G) light and/or red (R) light. Yellowing of the curved display panel at a bending location may be reduced.

The present disclosure provides a curved display panel. The curved display panel may include a first substrate, a second substrate, and spacers disposed between the first substrate and the second substrate. The first substrate may include a light-filtering layer. The light-filtering layer may include a plurality of first light-filtering units, a plurality of second light-filtering units, and a plurality of third light-filtering units. The ratio of the effective light-filtering area of a second light-filtering unit to the effective light-filtering area of a first light-filtering unit may be in a first preset range, and/or the ratio of the effective light-filtering area of a third light-filtering unit to the effective light-filtering area of a first light-filtering unit may be in the first preset range. The first preset range may be greater than or equal to about 0.9 and less than about 1, or greater than about 1 and less than or equal to about 1.1. Light passing through a first light-filtering unit, a second light-filtering unit, and a third light-filtering unit may form light of three primary colors.

By applying the first preset range, human eyes are not able to distinguish the display differences in different subpixels. Thus, when the ratio of the effective light-filtering area of a second light-filtering unit to the effective light-filtering area of a first light-filtering unit is in the first preset range, the effective light-filtering area of the first light-filtering unit is the same as, or similar or comparable to the effective light-filtering area of the second light-filtering area. Also, when the ratio of the effective light-filtering area of a third light-filtering unit to the effective light-filtering area of a first light-filtering unit is in the first preset range, the effective light-filtering area of the first light-filtering unit is the same as, or similar or comparable to the effective light-filtering area of the third light-filtering area. Thus, even when the curved display panel is deformed or bent such that the effective display area of a first light-filtering unit, disposed with a spacer, is further reduced, human eyes are not able to distinguish the intensity differences of the monochromatic light emitted by the first light-filtering units, the second light-filtering units, and the third light-filtering units, with comparable effective light-filtering areas. That is, by reducing the differences in the intensities of monochromatic light emitted by the light-filtering units, display differences caused by the intensity differences of the monochromatic light may be reduced or may be less likely to occur.

Embodiments of the present disclosure are illustrated using blue (G) light, green (G) light, and red (R) light. In the embodiments, human eyes may recognize the blue (B) light, the green (G) light, and the red (R) light as having the same intensity.

Embodiment One

Exemplary light-transmitting holes may be formed to reduce the effective light-filtering areas of the second light-filtering unit 2102 and the third light-filtering unit 2103. Monochromatic green (G) light, formed by the white light emitted by the backlight source passing through a second light-filtering unit 2102, may have a reduced intensity. Monochromatic red (R) light, formed by the white light emitted by the backlight source passing through a third light-filtering unit 2103, may have a reduced intensity. Thus, human eyes may recognize the intensities of the green (G) light and the red (R) light to be comparable with the blue (B) light, which is formed by the white light passing through a first light-filtering unit 2102 with a reduced effective display area. The intensities of the blue (B) light, green (G) light, and red (R) light may reach a balanced state. The reduced effective display area may be caused by the spacer disposed at the location of the first light-filtering unit 2101.

Figure 3:
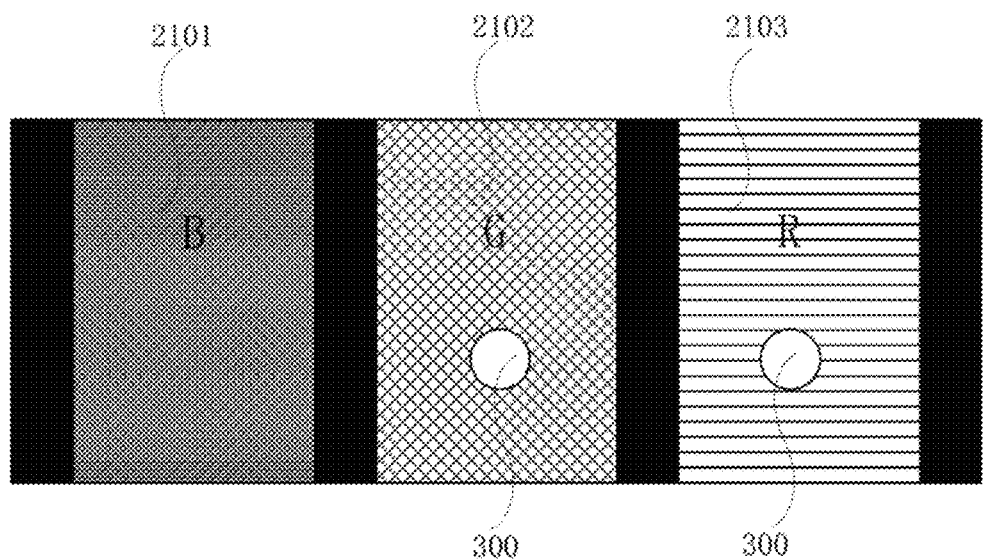
FIG. 3 illustrates a top view of exemplary light-transmitting holes used in light-filtering units of the curved display panel illustrated in FIG. 2 according to various disclosed embodiments of the present disclosure.

Specifically, as shown in FIG. 3, at least one light-transmitting hole 300 may be formed in the second light-filtering unit 2102. In some embodiments, at least one light-transmitting hole 300 may be formed in the third light-filtering unit 2103. The fabrication step to form the light-transmitting holes 300 may include applying a suitable mask in a photolithography process, and an etching process on the light-filtering layer 210. The locations of the light-transmitting holes 300 may correspond to the locations of the second light-filtering unit 2102 and/or the third light-filtering unit 2103. The light-filtering layer 210 may be formed before the fabrication of the light-transmitting holes 300.

Figure 4A:
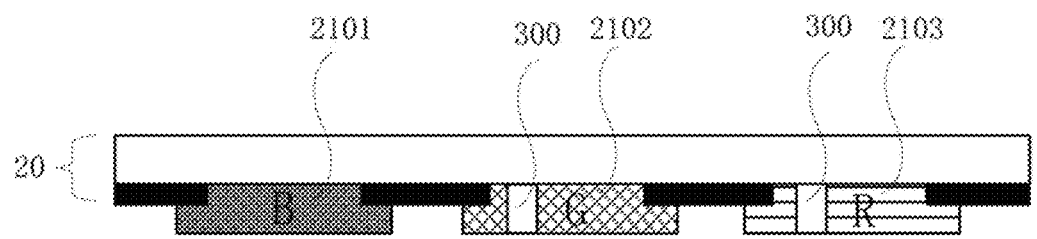
FIG. 4a illustrates an exemplary cross-sectional view of the light-transmitting holes illustrated in FIG. 3 according to various disclosed embodiments of the present disclosure.
Figure 4B:
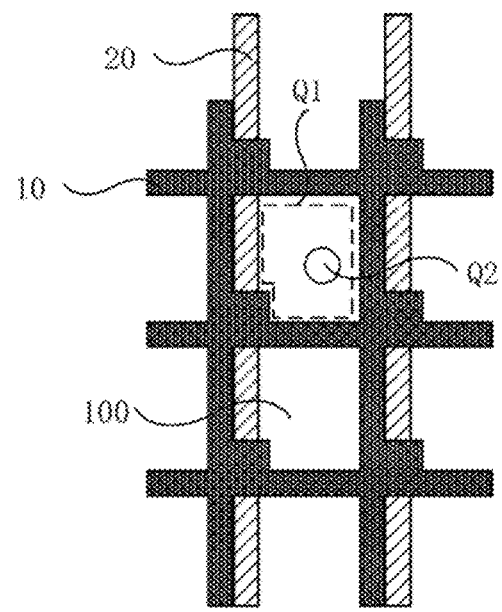
FIG. 4b illustrates the effective light-filtering area of an exemplary light-filtering unit with a light-transmitting hole illustrated in FIG. 3 according to various disclosed embodiments of the present disclosure.

A cross-sectional view of the light-filtering units and the light-transmitting holes is shown in FIG. 4a. The second light-filtering unit 2102 is used as an example to illustrate the effective light-filtering area. As shown in FIG. 4a, after the curved display panel undergoes deformation, the effective display area of the subpixel 100 corresponding to the second light-filtering unit 2102 may be Q1. When at least one light-transmitting hole 300, each having an area of Q2, is formed in the second light-filtering unit 2102, the effective light-filtering area of the second light-filtering unit 2102 may be (Q1−n×Q2), where n represents the number of light-transmitting holes 300 formed in the second light-filtering unit 2102 and may be an integer greater than or equal to 1. In the present disclosure, the effective display area of a light-filtering unit refers to the area of the corresponding subpixel that allows light to pass through. The dashed box in FIG. 4b illustrates an exemplary effective display area.

The effective light-filtering area of the third light-filtering unit 2103 may be similar to the description of the effective light-filtering area of the second light-filtering unit 2102 and is not repeated herein.

By applying light-transmitting holes 300 in the second light-filtering unit 2102 and/or in the third light-filtering unit 2103, intensity of the white light emitted by the backlight source may be increased. The light-transmitting holes 300 may also decrease the effective light-filtering areas of the second light-filtering unit 2102 and/or the third light-filtering unit 2103. Accordingly, the effective light-filtering area of the second light-filtering unit 2102 and/or the third light-filtering unit 2103 may be the same as or comparable to the effective light-filtering area of the first light-filtering unit 2101. It can be ensured that, the blue (B) light, the green (G) light, and the red (R) light, formed by the white light passing through the first light-filtering unit 2101, the second light-filtering unit 2102, and the third light-filtering unit 2103, may have the same or comparable intensities. Human eyes are not able to distinguish the intensity differences of different monochromatic light. In this case, a great portion of the green (G) light and a great portion of the red (R) light may mix with blue (B) light and form white light. The desirably small portions of the green (G) light and the red (R) light, formed by the white light passing through the light-transmitting holes 300, may mix to form yellow light, which may not be distinguished or recognized by human eyes. Thus, when the curved display panel is displaying images, the user may be less likely to notice the yellowing of the displayed images at the bending locations of the curved display panel.

It should be noted that, the specific shape and number of the light-transmitting holes 300 should be determined according to different applications and should not be limited by the embodiments of the preset disclosure. It may be desired that after the light-transmitting holes 300 are formed, the ratio of the effective light-filtering area of the second light-filtering unit 2102 and/or the effective light-filtering area of the third light-filtering unit 2103 to the effective light-filtering area of the first light-filtering unit 2101 may be in the first preset range. In some embodiments, it may be more convenient to form light-transmitting holes 300 of a regular shape such as a circular shape, a rectangular shape, and a triangular shape.

Further, when a plurality of light-transmitting holes 300 are formed in the second light-filtering unit 2102 and/or in the third light-filtering unit 2103, the light-transmitting holes 300 may be arranged uniformly to avoid dense arrangement of the light-transmitting holes 300 at a particular location. Thus, white light of unevenly high intensities, caused by densely arranged light-transmitting holes 300 at particular locations, may be avoided. Non-uniformities in the intensities of the chromatic light emitted by the second light-filtering unit 2102 and the third light-filtering unit 2103 may be prevented.

Further, the diameter of a light-transmitting hole 300 may be greater than or equal to 3 µm. Compared to forming light-transmitting holes 300 with a diameter smaller than 3 µm, forming light-transmitting holes 300 with a diameter greater than or equal to 3 µm may be less costly.

Embodiment Two

White light-filtering subunits may be formed to reduce the effective light-filtering area of the second light-filtering unit 2102 and/or the effective light-filtering area of the third light-filtering unit 2103. A white light-filtering subunit may convert light, e.g., green light and red light, passing through the white light-filtering subunit to white light. The chromatic green (G) light, formed by the white light emitted by the backlight source and passing through a second light-filtering unit 2102, may have a decreased intensity. The chromatic red (R) light, formed by the white light emitted by the backlight source and passing through a third light-filtering unit 2103, may have a decreased intensity. Thus, human eyes are not able to distinguish the intensity differences of different monochromatic light. The intensities of the blue (B) light, green (G) light, and red (R) light may reach a balanced state. Specifically, human eyes may recognize the blue (B) light, formed by white light passing through a first light-filtering unit 2101 that has a decreased effective display area caused by a spacer, as having a same or comparable intensity with the green (G) light and the red (R) light.

Figure 5:
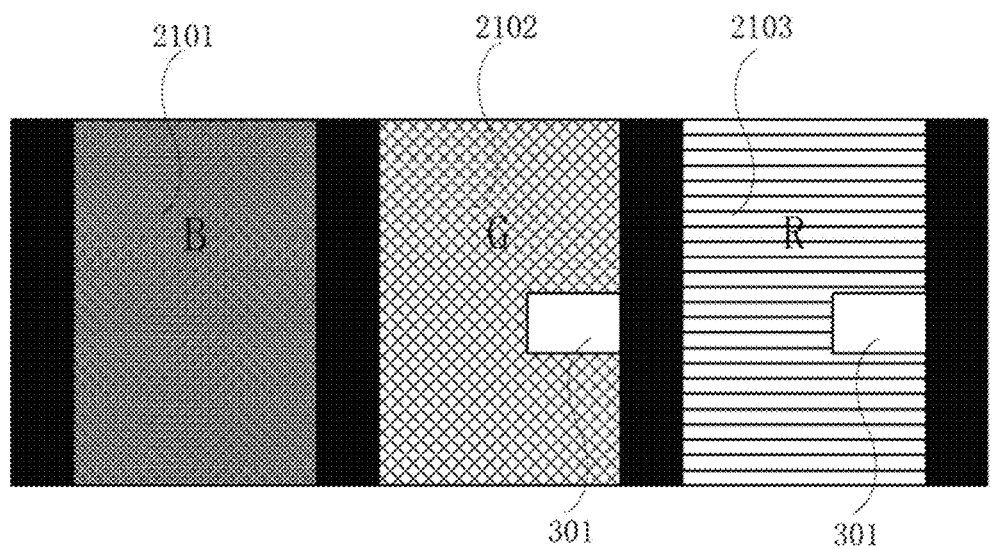
FIG. 5 illustrates a top view of exemplary white light-filtering subunits used in the light-filtering units of the curved display panel illustrated in FIG. 2 according to various disclosed embodiments of the present disclosure.

FIG. 5 illustrates a top view of the light-filtering units with white light-filtering subunits. Specifically, as shown in FIG. 5, at least one white light-filtering subunit 301 may be formed on the second light-filtering unit 2102. In some embodiments, at least one white light-filtering subunit 301 may be formed on the third light-filtering unit 2103. When the light-filtering layer 210 is being formed, a suitable mask, a photolithography process, and an etching process may be applied to form the white light-filtering subunits 301. The locations of the white light-filtering subunits 301 may correspond to the locations of the second light-filtering unit 2102 and/or the third light-filtering unit 2103. The white light-filtering subunits 301 may be made of a suitable white or transparent material such as resin.

By applying white light-filtering subunits 301 in the second light-filtering unit 2102 and/or in the third light-filtering unit 2103, intensity of the white light emitted by the backlight source may be increased. The white light-filtering subunits 301 may also decrease the effective light-filtering areas of the second light-filtering unit 2102 and/or the third light-filtering unit 2103. Accordingly, the effective light-filtering area of the second light-filtering unit 2102 and/or the third light-filtering unit 2103 may be the same as or comparable to the effective light-filtering area of the first light-filtering unit 2101. It can be ensured that, the blue (B) light, the green (G) light, and the red, formed by the white light passing through the first light-filtering unit 2101, the second light-filtering unit 2102, and the third light-filtering unit 2103, may have same or comparable intensities. Human eyes are not able to distinguish the differences in the intensities of different monochromatic light. In this case, a great portion of the green (G) light and a great portion of the red (R) light may mix with blue (B) light and form white light. The desired small portions of the green (G) light and the red (R) light may mix to form yellow light, which may not be distinguished or recognized by human eyes. Thus, when the curved display panel is displaying images, the user may be less likely to notice the yellowing of the displayed images at the bending locations of the curved display panel.

It should be noted that, the specific shape and number of the white light-filtering subunits 301 should be determined according to different applications and should not be limited by the embodiments of the preset disclosure. It may be desired that after the white light-filtering subunits 301 are formed, the ratio of the effective light-filtering area of the second light-filtering unit 2102 and/or the effective light-filtering area of the third light-filtering unit 2103 to the effective light-filtering area of the first light-filtering unit 2101 may be in the first preset range. In some embodiments, it may be more convenient to form white light-filtering subunits 301 of a regular shape such as a circular shape, a rectangular shape, and a triangular shape.

Further, when a plurality of white light-filtering subunits 301 are formed in the second light-filtering unit 2102 and/or in the third light-filtering unit 2103, the white light-filtering subunits 301 may be arranged uniformly to avoid dense arrangement of the white light-filtering subunits 301 at a particular location. Thus, white light of unevenly high intensities, caused by densely arranged white light-filtering subunits 301 at particular locations, may be avoided. Non-uniformities in the intensities of the chromatic light emitted by the second light-filtering unit 2102 and the third light-filtering unit 2103 may be prevented.

Further, the area of a white light-filtering subunit 301 may be greater than or equal to 9 $\mu m^2$. Compared to forming white light-filtering subunits 301 with an area smaller than 9 $\mu m^2$, forming white light-filtering subunits 301 with an area greater than or equal to 9 $\mu m^2$ may be less costly.

Further, the deformation of the curved display panel may cause the effective display area of a first light-filtering unit 2101 at a bending location, disposed with a spacer, to further decrease, and the intensity of the white light, emitted by the backlight source and passing through the first light-filtering unit 2101, may be further decreased. That is, the light transmission rate of the first light-filtering unit 2101 may be reduced and the first light-filtering unit 2101 may have a lower brightness level compared to other light-filtering units. As a result, the bending locations of the curved display panel may appear dark.

To solve the issues described above, the light transmission rate of the first light-filtering unit 2101 may be higher than or lower than the light transmission rate of the second light-filtering unit 2102 and/or the light transmission rate of the third light-filtering unit 2103. In some embodiments, the ratio of the light transmission rate of the first light-filtering unit 2101 to the light transmission rate of the second light-filtering unit 2102 may be set to be in a second preset range. In some embodiments, the ratio of the light transmission rate of the first light-filtering unit 2101 to the light transmission rate of the third light-filtering unit 2103 may be set to be in the second preset range. The second preset range may be greater than or equal to about 0.8 and less than about 1, or greater than about 1 and less than or equal to about 1.2.

By applying the second preset range, human eyes are not able to distinguish the differences in the light transmission rates of different light-filtering units. Even when the curved display panel undergoes deformation and the effective display area of a first light-filtering unit 2101 at a bending location, disposed with a spacer, is further decreased, the light transmission rates of the first light-filtering unit 2101, the second light-filtering unit 2102, and the third light-filtering unit 2103 may be comparable or same. It can thus be ensured that, the brightness levels of the blue (B) light, the green (G) light, and the red (R) light, formed by the white light emitted by the backlight source and passing through the first light-filtering unit 2101, the second light-filtering unit 2102, and the third light-filtering unit 2103, may be the same or comparable. Issues such as the curved display panel appearing dark at the bending locations, caused by the reduced display area of the first light-filtering unit 2101 and the reduced light transmission rate of blue (B) light, may be less likely to occur.

Further, by setting the second preset range to be greater than or equal to about 0.8 and less than about 1, or greater than about 1 and less than or equal to about 1.2, the difference between the light transmission rates of the first light-filtering unit 2101 and the second light-filtering unit 2102 may be controlled to be less than about 20%, and/or the difference between the light transmission rates of the first light-filtering unit 2101 and the third light-filtering unit 2103 may be controlled to be less than about 20%. The light transmission rate of the first light-filtering unit 2101 may be sufficiently close to the light transmission rate of the second light-filtering unit 2102 and/or the light transmission rate of the third light-filtering unit 2103. Human eyes are not able to distinguish the difference between the brightness levels of the blue (B) light and the green (G) light/red (R) light. Issues such as the curved display panel appearing dark at the bending locations may be less likely to occur.

Embodiments of the present disclosure are illustrated using blue (G) light, green (G) light, and red (R) light. In the embodiments, human eyes may recognize the blue (B) light, the green (G) light, and the red (R) light being of the same brightness level.

Embodiment Three

The light transmission rate of a first light-filtering unit 2101 may be increased by reducing the thickness of the first light-filtering unit 2101 and/or increasing the thickness of a second light-filtering unit 2102. In some embodiments, the light transmission rate of a first light-filtering unit 2101 may be increased by reducing the thickness of the first light-filtering unit 2101 or increasing the thickness of a third light-filtering unit 2103. Thus, the green (G) light, formed by the white light emitted by the backlight source and passing through the second light-filtering unit 2102, and the red (R) light, formed by the white light emitted by the backlight source and passing through the third light-filtering unit 2103, may have same or comparable brightness level as the blue (B) light. The blue (B) light is formed by the white light emitted by the backlight source passing through the first light-filtering unit 2101, which has a decreased effective display area caused by the formation of a spacer. The brightness levels of the blue (B) light, green (G) light, and red (R) light may reach a balanced state. Human eyes are not able to distinguish the difference between the brightness levels of the blue (B) light and the red (R) light/green (G) light.

Figure 6:
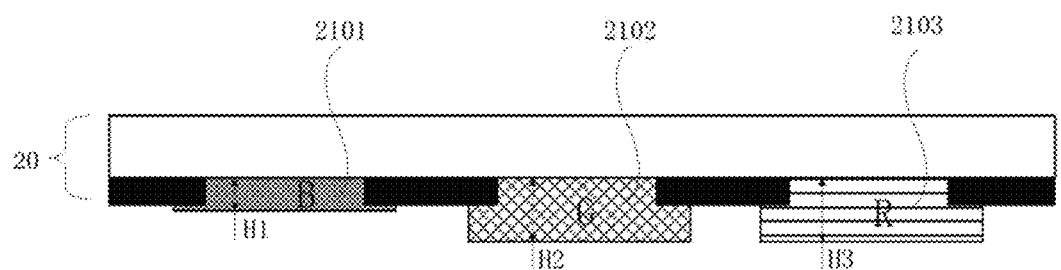
FIG. 6 illustrates the cross-sectional view of another exemplary color filter substrate in the curved display panel according to various disclosed embodiments of the present disclosure.

FIG. 6 illustrates a cross-sectional view of the first light-filtering unit 2101, the second light-filtering unit 2102, and the third light-filtering unit 2103 when the thicknesses of the second light-filtering unit 2102 and the third light-filtering unit 2103 are greater than the thickness of the first light-filtering unit 2101. Specifically, as shown in FIG. 6, the thickness or height of the first light-filtering unit 2101, H1, may be smaller than the thickness or height of the second light-filtering unit 2102, H2. For example, when the material for forming the light-filtering layer 210, e.g., resin, is being coated on the substrate, a suitable mask, a photolithography process, and an etching process may be applied to form a first light-filtering unit 2101 at a desired location. The formed first light-filtering unit 2101 may have a smaller thickness than the second light-filtering unit 2102 and the third light-filtering unit 2103. Alternatively, when the material for forming the light-filtering layer 210, e.g., resin, is being coated on the substrate, a suitable mask, a photolithography process, and an etching process may be applied to form a second light-filtering unit 2102 at a desired location. The formed second light-filtering unit 2102 may have a greater thickness than the first light-filtering unit 2101.

In some embodiments, the thickness of the first light-filtering unit 2101, H1, may be smaller than the thickness of the third light-filtering unit 2102, H3. The fabrications of the first light-filtering unit 2101 and third light-filtering unit 2103 may be the same as the fabrication process for forming the first light-filtering unit 2101 and second light-filtering unit 2102 described previously and is not repeated herein.

Thus, by increasing the thickness of the second light-filtering unit 2102 and/or the thickness of the third light-filtering unit 2103, or decreasing the thickness of the first light-filtering unit 2101, the light transmission rate of the first light-filtering unit 2101 may be increased. Accordingly, the light transmission rate of the second light-filtering unit 2102 and/or the light transmission rate of the third light-filtering unit 2103 may be comparable to the light transmission rate of the first light-filtering unit 2101. It can thus be ensured that, the brightness levels of the blue (B) light, the green (G) light, and the red (R) light, formed by the white light emitted by the backlight source pass through the first light-filtering unit 2101, the second light-filtering unit 2102, and the third light-filtering unit 2103, may be the same or comparable. Human eyes are not able to notice the displayed images appearing dark at a bending location when the curved display panel is display images.

Embodiment Four

In Embodiment Four, a protective layer or an overcoat layer may be disposed on the second substrate to cover the light-filtering layer 210. The portion of the protective layer covering a first light-filtering unit 2101 may have a reduced thickness. In some embodiments, the portion of the protective layer covering a second light-filtering unit 2102 may have an increased thickness. In some embodiments, the portion of the protective layer covering a third light-filtering unit 2103 may have an increased thickness. Thus, light transmission rate of the first light-filtering unit 2101 may be improved. The green (G) light, formed by the white light emitted by the backlight source and passing through the second light-filtering unit 2102, and the red (R) light, formed by the white light emitted by the backlight source and passing through the third light-filtering unit 2103, may have same or comparable brightness level as the blue (B) light. The blue (B) light is formed by the white light emitted by the backlight source passing through the first light-filtering unit 2101, which has a decreased effective display area caused by the formation of a spacer. The balance levels of the blue (B) light, green (G) light, and red (R) light may reach a balanced state. Human eyes are not able to distinguish the difference between the brightness levels of the blue (B) light and the red (R) light/green (G) light.

Figure 7:
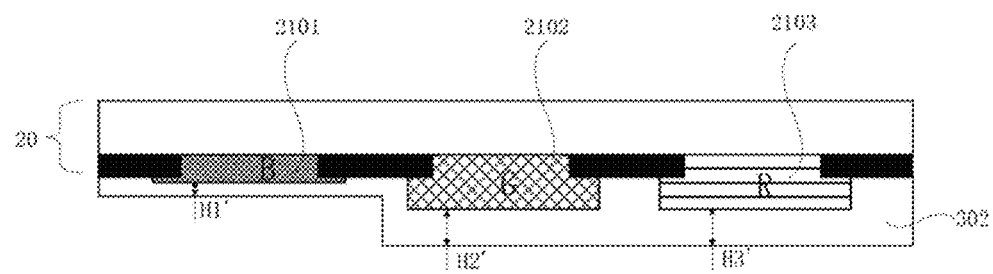
FIG. 7 illustrates the cross-sectional view of another exemplary color filter substrate in the curved display panel according to various disclosed embodiments of the present disclosure.

FIG. 7 illustrates a cross-sectional view of the light-filtering units and the protective layer 302. As shown in FIG. 7, the portion of the protective layer 302 covering the first light-filtering unit 2101 may have a thickness of H1', and the portion of the protective layer 302 covering the second light-filtering unit 2102 may have a thickness of H2'. H1' may be smaller than H2'. For example, a material for forming the protective layer 302, e.g., a transparent resin, may be coated on the substrate. Further, a suitable mask, a photolithography process, and an etching process may be applied to reduce the thickness of the protective layer 302 that covers the first light-filtering unit 2101. The portion of the protective layer 302 covering the first light-filtering unit 2101 may have a smaller thickness H1'. In some embodiments, the portion of the protective layer 302 covering the second light-filtering unit 2102 may have a greater thickness H2'.

In some embodiments, the portion of the protective layer 302 covering the first light-filtering unit 2101 may have a thickness of H1', and the portion of the protective layer 302 covering the third light-filtering unit 2103 may have a thickness of H3'. H1' may be smaller than H3'. The fabrication of the first light-filtering unit 2101 and the third light-filtering unit 2103 may be similar to the fabrication process for forming the first light-filtering unit 2101 and the second light-filtering unit 2102, as described previously, and is not repeated herein.

It should be noted that, when the protective layer 302 is formed to cover the first light-filtering unit 2101, the second light-filtering unit 2102, and the third light-filtering unit 2103, the thickness of the second light-filtering unit 2102 and/or the thickness of the third light-filtering unit 2103 may or may not be greater than the thickness of the first light-filtering unit 2101. That is, the thicknesses of the portions of the protective layer 302 that cover the first light-filtering unit 2101, the second light-filtering unit 2102, and the third light-filtering unit 2103 may be adjusted according to meet the light transmission requirement. i.e., the second preset range.

By increasing the thickness of the portion of the protective layer 302 covering the second light-filtering unit 2102 and/or the thickness of the portion of the protective layer 302 covering the third light-filtering unit 2103, or decreasing the thickness of the portion of the protective layer 302 covering the first light-filtering unit 2101, the light transmission rate of the first light-filtering unit 2101 may be increased. Accordingly, the light transmission rate of the second light-filtering unit 2102 and/or the light transmission rate of the third light-filtering unit 2103 may be comparable to or same as the light transmission rate of the first light-filtering unit 2101. It can thus be ensured that, the brightness levels of the blue (B) light, the green (G) light, and the red (R) light, formed by the white light emitted by the backlight source and passing through the first light-filtering unit 2101, the second light-filtering unit 2102, and the third light-filtering unit 2103, may be the same or comparable. Human eyes are not able to notice the displayed images appearing dark at a bending location when the curved display panel is display images.

Referring to FIG. 2, an exemplary cross-sectional view of the curved display panel is illustrated. The disclosed curved display panel may include a first substrate and a second substrate aligned and bonded together. The curved display panel may also include spacers 30 formed between the first substrate and the second substrate. In some embodiments, the first substrate may be a color filter substrate 20, and the second substrate may be an array substrate 10. For illustrative purposes, the disclosure is illustrated with the first substrate being the color filter substrate 20 and the second substrate being the array substrate 10. In other various embodiments, the first substrate may be the array substrate 10 and the second substrate may be the color filter substrate 20.

The first substrate may include a light-filtering layer 210 for filtering the white light emitted by the backlight of the curved display panel. The light-filtering layer 210 may include a plurality of light-filtering units. As shown in FIG. 2, a first light-filtering unit 2101 may correspond to a first subpixel in a pixel unit, a second light-filtering unit 2102 may correspond to a second subpixel in the pixel unit, and a third light-filtering unit 2103 may correspond to a third subpixel in the pixel unit. A spacer 30 may correspond to the location of a first light-filtering unit 2101.

By applying the first preset range, human eyes are not able to distinguish the intensity differences among monochromatic light emitted by different light-filtering units. Thus, even when the curved display panel is deformed, causing the effective display area of a first light-filtering unit 2101, located at a bending location and disposed with a spacer 30, to further decrease, the effective light-filtering areas of the first light-filtering unit 2101, the second light-filtering unit 2102, and the third light-filtering unit 2103 may be the same or comparable. It can be ensured that, the white light emitted by the backlight source, after passing through the first light-filtering units 2101, the second light-filtering units 2102, and the third light-filtering units 2103, may be converted to blue (B) light, green (G) light, and red (R) light of comparable or same intensities. Human eyes are not able to distinguish the intensity differences among the monochromatic light emitted by each light-filtering unit. Accordingly, yellowing of the curved display panel at a bending location, caused by reduced effective display area of a first light-filtering unit 2101 and a reduced amount of blue (B) light, may be less likely to occur. In other words, after forming yellow light by mixing the green (G) light and the red (R) light, which are of greater intensities compared to the reduced amount of blue (B) light, failure of proper mixing between the blue (B) light and the yellow light may be less likely to occur.

Further, the ratio of the light transmission rate of the first light-filtering unit 2101 to the light transmission rate of the second light-filtering unit 2102 may be in the second preset range. In some embodiments, the ratio of the light transmission rate of the first light-filtering unit 2101 to the light transmission rate of the third light-filtering unit 2103 may be in the second preset range. The second preset range to be greater than or equal to about 0.8 and less than about 1, or greater than about 1 and less than or equal to about 1.2. Light passing through the first light-filtering unit 2101, the second light-filtering unit 2102, and the third light-filtering unit 2103 may form light of three primary colors.

Further, by setting the second preset range to be greater than or equal to about 0.8 and less than about 1, or greater than about 1 and less than or equal to about 1.2, the difference between the light transmission rates of the first light-filtering unit 2101 and the second light-filtering unit 2102/the third light-filtering unit 2103 may be controlled to be less than about 20%. The light transmission rate of the first light-filtering unit 2101 may be sufficiently close to the light transmission rate of the second light-filtering unit 2102 and/or the light transmission rate of the third light-filtering unit 2103. Human eyes are not able to distinguish the difference between the brightness levels of the blue (B) light and the green (G) light/red (R) light. Issues such as the curved display panel appearing dark at the bending locations may be less likely to occur.

Further, by setting the second preset range, human eyes are not able to distinguish display differences among different subpixels. When the ratio of the light transmission rate of the first light-filtering unit to the light transmission rate of the second light-filtering unit and/or of the third light-filtering unit is in the second preset range, the light transmission rate of the first light-filtering unit may be comparable to or same as the light transmission rate of the second light-filtering unit and/or of the third light-filtering unit. Thus, even when the curved display panel is deformed or bent such that the effective display area of a first light-filtering unit, disposed with a spacer, is further reduced, human eyes are not able to distinguish the differences in the brightness levels of monochromatic light emitted by the first light-filtering units, the second light-filtering units, and the third light-filtering units with comparable light transmission rates. That is, by reducing the differences in the brightness levels of monochromatic light emitted by the light-filtering units, display differences caused by the differences in the brightness levels of monochromatic light may be reduced or may be less likely to occur.

Embodiments of the present disclosure provides a curved display panel. The curved display panel includes: a first substrate, a second substrate, and a spacer between the first substrate and the second substrate, the first substrate comprising a light-filtering layer. The light-filtering layer comprises a first light-filtering unit, a second light-filtering unit, and a third light-filtering unit in a pixel unit, the spacer being at a location of the first light-filtering unit; and at least one of a ratio of a light transmission rate of the first light-filtering unit to a light transmission rate of the second light-filtering unit and a ratio of a light transmission rate of the first light-filtering unit to a light transmission rate of the third light-filtering unit is in a second preset range, the second preset range being greater than or equal to about 0.8 and less than about 1, or greater than about 1 and less than or equal to about 1.2.

Embodiments of the present disclosure are illustrated using blue (G) light, green (G) light, and red (R) light. In the embodiments, human eyes may recognize the blue (B) light, the green (G) light, and the red (R) light being of the same brightness level.

Embodiment Five

The light transmission rate of a first light-filtering unit 2101 may be increased by reducing the thickness of the first light-filtering unit 2101 and/or increasing the thickness of a second light-filtering unit 2102. In some embodiments, the light transmission rate of a first light-filtering unit 2101 may be increased by reducing the thickness of the first light-filtering unit 2101 or increasing the thickness of a third light-filtering unit 2103. Thus, the green (G) light, formed by the white light emitted by the backlight source and passing through the second light-filtering unit 2102, and the red (R) light, formed by the white light emitted by the backlight source and passing through the third light-filtering unit 2103, may have same or comparable brightness level as the blue (B) light. The blue (B) light is formed by the white light emitted by the backlight source passing through the first light-filtering unit 2101, which has a decreased effective display area caused by the formation of a spacer. The brightness levels of the blue (B) light, green (G) light, and red (R) light may reach a balanced state. Human eyes are not able to distinguish the difference between the brightness levels of the blue (B) light and the red (R) light/green (G) light.

FIG. 6 illustrates a cross-sectional view of the first light-filtering unit 2101, the second light-filtering unit 2102, and the third light-filtering unit 2103 when the thicknesses of the second light-filtering unit 2102 and the third light-filtering unit 2103 are greater than the thickness of the first light-filtering unit 2101. Specifically, as shown in FIG. 6, the thickness or height of the first light-filtering unit 2101, H1, may be smaller than the thickness or height of the second light-filtering unit 2102, H2. For example, when the material for forming the light-filtering layer 210, e.g., resin, is being coated on the substrate, a suitable mask, a photolithography process, and an etching process may be applied to form a first light-filtering unit 2101 at a desired location. The formed first light-filtering unit 2101 may have a smaller thickness than the second light-filtering unit 2102 and the third light-filtering unit 2103. Alternatively, when the material for forming the light-filtering layer 210, e.g., resin, is being coated on the substrate, a suitable mask, a photolithography process, and an etching process may be applied to form a second light-filtering unit 2102 at a desired location. The formed second light-filtering unit 2102 may have a greater thickness than the first light-filtering unit 2101.

In some embodiments, the thickness of the first light-filtering unit 2101, H1, may be smaller than the thickness of the third light-filtering unit 2102, H3. The fabrications of the first light-filtering unit 2101 and third light-filtering unit 2103 may be the same as the fabrication process for forming the first light-filtering unit 2101 and second light-filtering unit 2102 described previously and is not repeated herein.

Thus, by increasing the thickness of the second light-filtering unit 2102 and/or the thickness of the third light-filtering unit 2103, or decreasing the thickness of the first light-filtering unit 2101, the light transmission rate of the first light-filtering unit 2101 may be increased. Accordingly, the light transmission rate of the second light-filtering unit 2102 and/or the light transmission rate of the third light-filtering unit 2103 may be comparable to the light transmission rate of the first light-filtering unit 2101. It can thus be ensured that, the brightness levels of the blue (B) light, the green (G) light, and the red (R) light, formed by the white light emitted by the backlight source pass through the first light-filtering unit 2101, the second light-filtering unit 2102, and the third light-filtering unit 2103, may be the same or comparable. Human eyes are not able to notice the displayed images appearing dark at a bending location when the curved display panel is display images.

Embodiment Six

In Embodiment Four, a protective layer or an overcoat layer may be disposed on the second substrate to cover the light-filtering layer 210. The portion of the protective layer covering a first light-filtering unit 2101 may have a reduced thickness. In some embodiments, the portion of the protective layer covering a second light-filtering unit 2102 may have an increased thickness. In some embodiments, the portion of the protective layer covering a third light-filtering unit 2103 may have an increased thickness. Thus, light transmission rate of the first light-filtering unit 2101 may be improved. The green (G) light, formed by the white light emitted by the backlight source and passing through the second light-filtering unit 2102, and the red (R) light, formed by the white light emitted by the backlight source and passing through the third light-filtering unit 2103, may have same or comparable brightness level as the blue (B) light. The blue (B) light is formed by the white light emitted by the backlight source passing through the first light-filtering unit 2101, which has a decreased effective display area caused by the formation of a spacer. The balance levels of the blue (B) light, green (G) light, and red (R) light may reach a balanced state. Human eyes are not able to distinguish the difference between the brightness levels of the blue (B) light and the red (R) light/green (G) light.

FIG. 7 illustrates a cross-sectional view of the light-filtering units and the protective layer 302. As shown in FIG. 7, the portion of the protective layer 302 covering the first light-filtering unit 2101 may have a thickness of H1', and the portion of the protective layer 302 covering the second light-filtering unit 2102 may have a thickness of H2'. H1' may be smaller than H2'. For example, a material for forming the protective layer 302, e.g., a transparent resin, may be coated on the substrate. Further, a suitable mask, a photolithography process, and an etching process may be applied to reduce the thickness of the protective layer 302 that covers the first light-filtering unit 2101. The portion of the protective layer 302 covering the first light-filtering unit 2101 may have a smaller thickness H1'. In some embodiments, the portion of the protective layer 302 covering the second light-filtering unit 2102 may have a greater thickness H2'.

In some embodiments, the portion of the protective layer 302 covering the first light-filtering unit 2101 may have a thickness of H1', and the portion of the protective layer 302 covering the third light-filtering unit 2103 may have a thickness of H3'. H1' may be smaller than H3'. The fabrication of the first light-filtering unit 2101 and the third light-filtering unit 2103 may be similar to the fabrication process for forming the first light-filtering unit 2101 and the second light-filtering unit 2102, as described previously, and is not repeated herein.

It should be noted that, when the protective layer 302 is formed to cover the first light-filtering unit 2101, the second light-filtering unit 2102, and the third light-filtering unit 2103, the thickness of the second light-filtering unit 2102 and/or the thickness of the third light-filtering unit 2103 may or may not be greater than the thickness of the first light-filtering unit 2101. That is, the thicknesses of the portions of the protective layer 302 that cover the first light-filtering unit 2101, the second light-filtering unit 2102, and the third light-filtering unit 2103 may be adjusted according to meet the light transmission requirement, i.e., the second preset range.

By increasing the thickness of the portion of the protective layer 302 covering the second light-filtering unit 2102 and/or the thickness of the portion of the protective layer 302 covering the third light-filtering unit 2103, or decreasing the thickness of the portion of the protective layer 302 covering the first light-filtering unit 2101, the light transmission rate of the first light-filtering unit 2101 may be increased. Accordingly, the light transmission rate of the second light-filtering unit 2102 and/or the light transmission rate of the third light-filtering unit 2103 may be comparable to or same as the light transmission rate of the first light-filtering unit 2101. It can thus be ensured that, the brightness levels of the blue (B) light, the green (G) light, and the red (R) light, formed by the white light emitted by the backlight source and passing through the first light-filtering unit 2101, the second light-filtering unit 2102, and the third light-filtering unit 2103, may be the same or comparable. Human eyes are not able to notice the displayed images appearing dark at a bending location when the curved display panel is display images.

Another aspect of the present disclosure provides a display device. The display device may incorporate one or more of the above-mentioned curved display panels. The display apparatus according to the embodiments of the present disclosure can be used in any product with display functions such as a television, an electronic paper, a digital photo frame, a mobile phone and a tablet computer.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A curved display panel, comprising:
a first substrate and an opposing second substrate, the first substrate comprising a light-filtering layer, wherein:
the light-filtering layer comprises a first light-filtering unit, a second light-filtering unit, and a third light-filtering unit in a pixel unit;
at least one of an effective light-filtering area of the second light-filtering unit and an effective light-filtering area of the third light-filtering unit is larger than or smaller than an effective light-filtering area of the first light-filtering unit;
a ratio of the effective light-filtering area of the second light-filtering unit to the effective light-filtering area of the first light-filtering unit is greater than or equal to about 0.9 and less than about 1, or is greater than about 1 and less than or equal to about 1.1;
a ratio of the effective light-filtering area of the third light-filtering unit to the effective light-filtering area of the first light-filtering unit is greater than or equal to about 0.9 and less than about 1, or is greater than about 1 and less than or equal to about 1.1;
the first light-filtering unit is a blue light-filtering unit;
the second light-filtering unit is a green light-filtering unit;
the third light-filtering unit is a red light-filtering unit; and
a thickness of the first light-filtering unit is smaller than each of a thickness of the second light-filtering unit and a thickness of the third light-filtering unit.

2. The curved display panel according to claim 1, wherein: at least one light-transmitting hole is formed in at least one of the second light-filtering unit and the third light-filtering unit, the light-transmitting hole allowing white light emitted by a backlight source to pass through.

3. The curved display panel according to claim 2, wherein: a diameter of a light-transmitting hole is greater than or equal to 3 μm.

4. The curved display panel according to claim 1, wherein: at least one white light-filtering subunit is formed on at least one of the second light-filtering unit and the third light-filtering unit, the white light-filtering subunit converting light pass there-through to white light.

5. The curved display panel according to claim 4, wherein an area of the white light-filtering subunit is greater than or equal to 9 μm$^2$.

6. A curved display panel, comprising: a first substrate and an opposing second substrate, the first substrate comprising a light-filtering layer, wherein:
the light-filtering layer comprises a first light-filtering unit, a second light-filtering unit, and a third light-filtering unit in a pixel unit;
a light transmission rate of the first light-filtering unit is higher than a light transmission rate of at least one of the second light-filtering unit and the third light-filtering unit;
a ratio of the light transmission rate of the first light-filtering the light unit to the light transmission rate of the second light-filtering unit is greater than about 1 and less than or equal to about 1.2;
a ratio of the light transmission rate of the first light-filtering unit to the light transmission rate of the third light-filtering unit is greater than about 1 and less than or equal to about 1.2;
the first light-filtering unit is a blue light-filtering unit;
the second light-filtering unit is a green light-filtering unit;
the third light-filtering unit is a red light-filtering unit; and
a thickness of the first light-filtering unit is smaller than each of a thickness of the second light-filtering unit and a thickness of the third light-filtering unit.

7. The curved display panel according to claim 6, further comprising a protective layer covering the first light-filtering unit, the second light-filtering unit, and the third light-filtering unit.

8. The curved display panel according to claim 7, wherein: a thickness of a portion of the protective layer covering the first light-filtering unit is smaller than a thickness of a portion of the protective layer covering the second light-filtering unit.

9. The curved display panel according to claim 7, wherein: a thickness of a portion of the protective layer covering the first light-filtering unit is smaller than a thickness of a portion of the protective layer covering the third light-filtering unit.

10. The curved display panel according to claim 1, wherein light passing through the first light-filtering unit, the second light-filtering unit, and the third light-filtering unit form light of three primary colors.

11. The curved display panel according to claim 10, wherein: the light passing through the first light-filtering unit is blue light; the light passing through the second light-filtering unit is green light; and the light pasting through the third light-filtering unit is red light.

12. A display device, comprising one or more of the curved display panel according to claim 1.

13. A display device, comprising one or more of the curved display panel according to claim 6.

* * * * *